Figure 1:
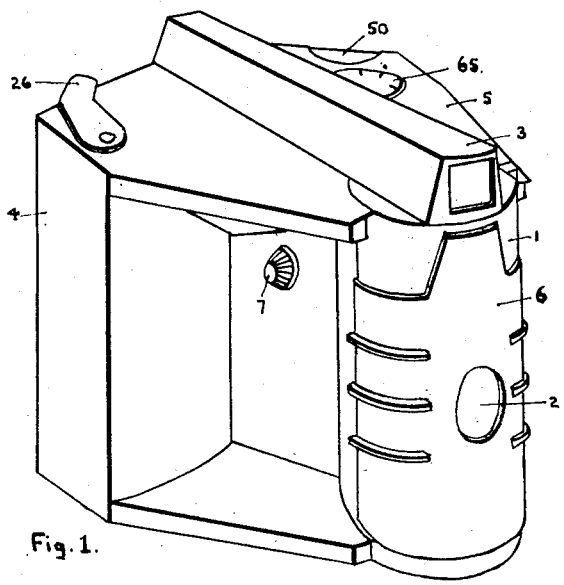

Nov. 17, 1953     T. W. CLIFFORD ET AL     2,659,283
FOLDING ROLL FILM CAMERA

Filed Dec. 15, 1950                         4 Sheets—Sheet 1

Inventors:
Thomas William Clifford and
John Mills,
By: Pierce, Scheffler & Parker,
Attorneys.

Nov. 17, 1953  T. W. CLIFFORD ET AL  2,659,283
FOLDING ROLL FILM CAMERA

Filed Dec. 15, 1950  4 Sheets-Sheet 3

Inventors:
Thomas William Clifford and
Josiah Mills,
By Pierce, Scheffler & Parker,
Attorneys.

Nov. 17, 1953     T. W. CLIFFORD ET AL     2,659,283
FOLDING ROLL FILM CAMERA
Filed Dec. 15, 1950     4 Sheets-Sheet 4
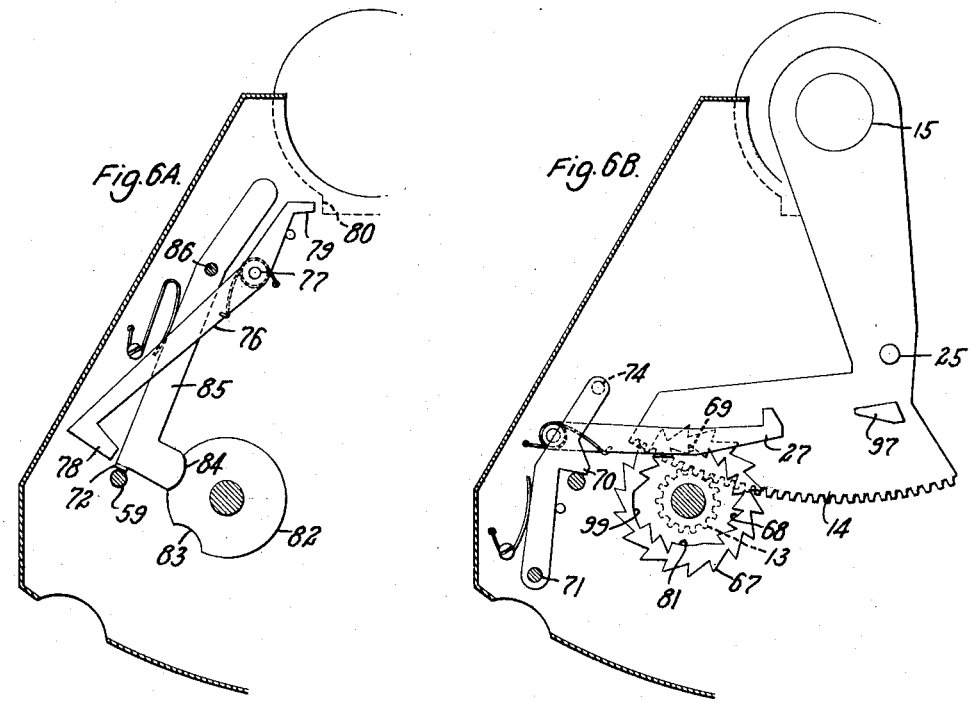
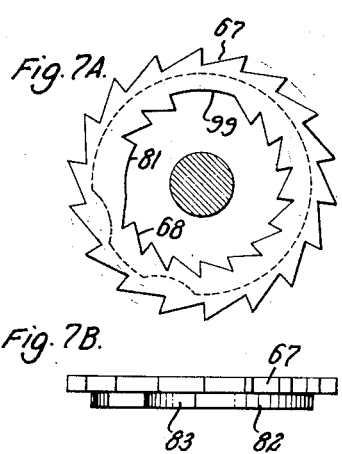
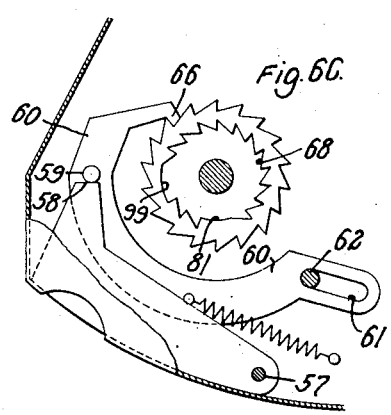
Inventors
Thomas William Clifford
John Mills
Pierce, Scheffler & Parker
Attorneys Patented Nov. 17, 1953

2,659,283

UNITED STATES PATENT OFFICE 2,659,283

FOLDING ROLL FILM CAMERA

Thomas William Clifford and John Mills, Leicester, England, assignors to Taylor, Taylor & Hobson Limited, Leicester, England, a British company Application December 15, 1950, Serial No. 200,942

Claims priority, application Great Britain December 20, 1949

21 Claims. (Cl. 95—32)

This invention relates to an improved photographic camera of the still picture kind employing roll-film.

Still picture cameras which are in most common use at the present time consist, principally, firstly of the box type and, secondly, of the folding bellows type.

The first type of camera, broadly speaking, although simple and inexpensive to construct is inclined to be bulky whilst the second type although overcoming the disadvantage of bulkiness is usually much more costly to manufacture due, among other things, to the expensive linkage and bellows arrangement necessary to accommodate the folding front. Both types, especially the latter, have several controls needing manual setting for readiness of operation.

One object of the present invention is to provide a camera which combines the advantages of the simplicity of the box camera with the compactness of the folding front bellows type of camera and yet, at the same time, avoids the square shape of the former and the normal folding front of the latter.

A further object of this invention is to utilise the opening and closing action to avoid the necessity of manual setting of the camera controls for operation and instead to effect some of these, such as winding the film and setting the shutter, by this folding or swinging action, thus enabling the camera to be used to take a rapid succession of pictures without any visual attention on the part of the operator to these particular controls and even without removing the camera from eye level.

According to this invention the camera is so constructed that the camera body folds in a manner in which the film spools and their encasing chambers approach one another in a direction across the focal plane of the lens.

By the focal plane of the lens is meant the plane or area where the image of the picture to be taken is formed by the lens.

Moreover, according to a further feature, the opening and closing action is utilised to operate the controls for transporting the film and setting the shutter.

Still further, the winding-on of the film leader to the starting point and ultimate winding of the trailer on to the take-up spool from the supply spool is also effected by the same swinging action.

In one embodiment of the invention the camera comprises three main parts consisting of a rigid front center member carrying a taking lens, shutter and viewfinder, and two side wing members hinged or pivoted thereto on the same axis and containing the delivery and take-up film spools respectively.

The wing members are swingable towards and away from each other and constitute encasing chambers for the rolls of film and by means of suitable gearing mechanism this swinging action is used to wind the film as well as to set the shutter. In addition, the two side wing members also form convenient hand grips for holding the camera.

For the better understanding of the invention a preferred embodiment thereof will now be described by way of example with reference to the accompanying drawings.

On the drawings—

Figure 4:
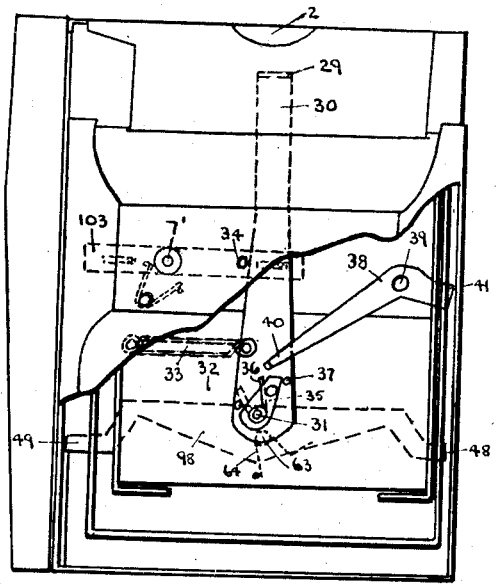
Figure 2:
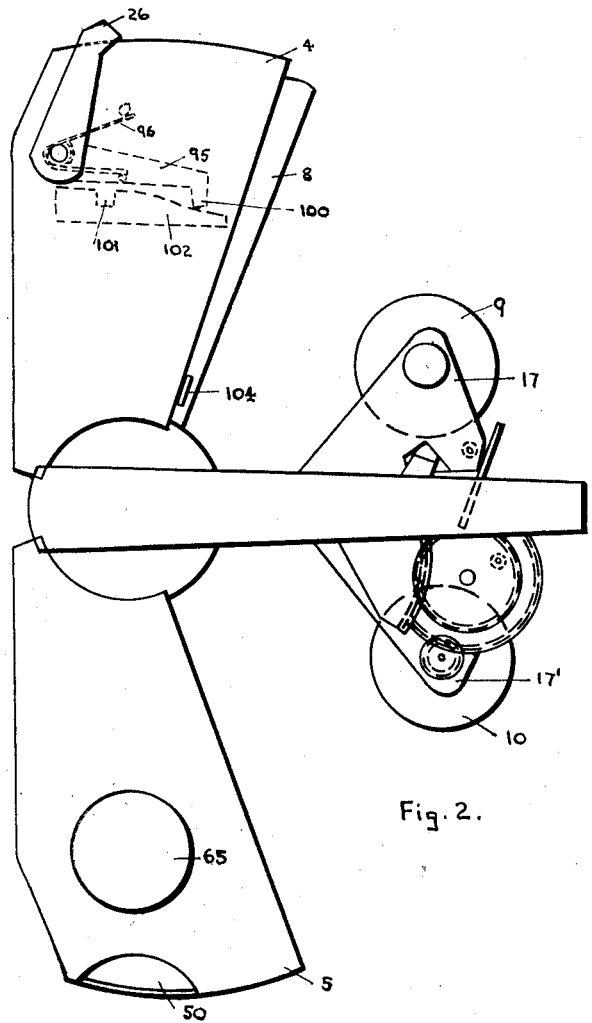
Figure 3:
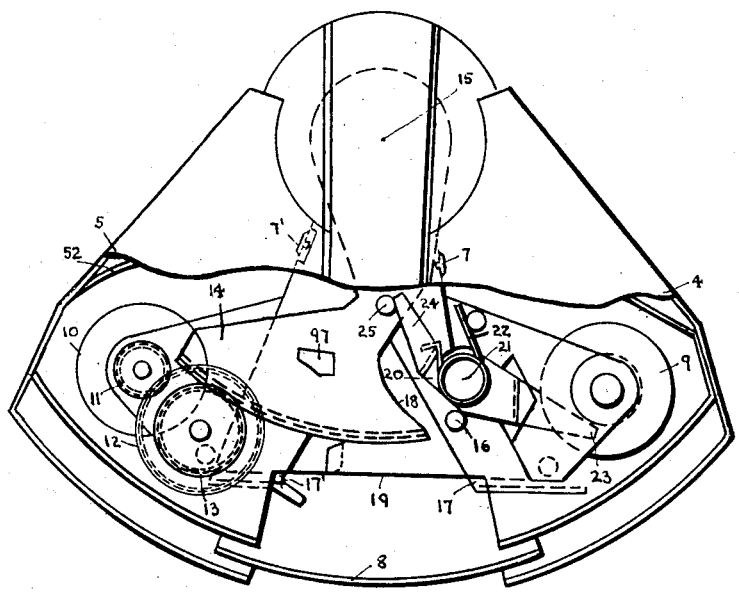
Figure 5:
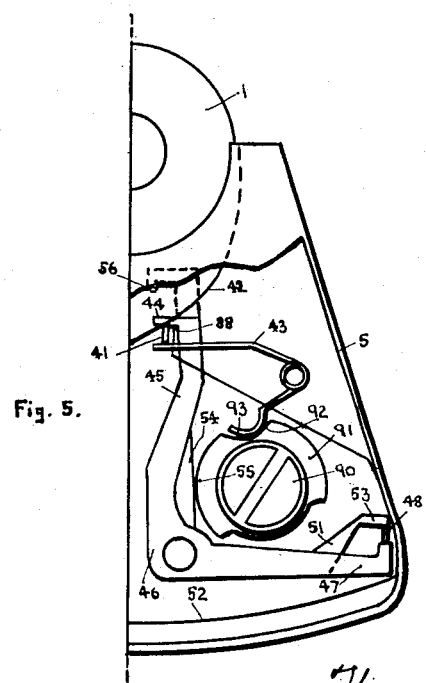

Fig. 1 illustrates a general perspective view of the camera in the folded condition, Fig. 2 illustrates a simplified plan view of the camera in the fully opened position ready for loading the film, Fig. 3 illustrates a plan view of the camera in the extended (picture taking) position, and shows details of the film transport mechanism operated by the opening and closing action of the wing members, Fig. 4 is a cross-section through the center stationary camera member, simplified to show details of the shutter operating mechanism carried by a frame hinged to the camera body, Fig. 5 illustrates details of the shutter timing mechanism and parts of the shutter operating mechanism enclosed by the left hand wing member in Fig. 3 as viewed from the underneath of Fig. 3, Figs. 6A, 6B and 6C are fragmentary and somewhat schematic sectional views illustrating, on a larger scale, details of the film take-up and counter mechanism, connections with the shutter operating mechanism, and shutter release button interlocks embodied in the left hand wing member in Fig. 3, as viewed from above Fig. 3, and Figs. 7A and 7B are a plan view and side elevation respectively of an internal ratchet gear incorporated in the counter mechanism.

Referring now to Fig. 1, the camera comprises three main parts consisting of a rigid front center member 1 carrying a taking lens 2, a shutter (described in greater detail hereinafter, more particularly with reference to Fig. 4) and a viewfinder 3; and two side wing members 4 and 5 pivotally hinged to the center member 1. The forward portion of the center member is of generally columnar form, and the view finder 3 comprises the usual lenses in a shallow box housing which enters rearwardly from the top of the columnar portion of the center member. The wing members are of segmental form, as viewed in plan, with rigid top and bottom walls connected by a rigid outer side wall and a rigid arcuate end wall, the wing members having inner arcuate end walls 4' and 5' respectively.

The wing member 4 constitutes an encasing chamber for the film delivery spool and the wing member 5 constitutes an encasing chamber for the film take-up spool and, also, ancillary operating mechanism. The two wing members are swingable towards and away from each other and are arranged to fold in a direction in which they and the film spools approach one another across the focal plane of the lens, that is, the plane or area where the image of the picture to be taken is formed by the lens.

By means of the operating mechanism referred to this moving action is used to wind the film as well as to set the shutter, the two side wing members 4 and 5 forming convenient hand grips for holding the camera and effecting these operations.

The viewfinder 3 extends the length of the camera and its exceptional length enables it to be of high performance. The taking lens 2 is mounted in the same plane as the viewfinder and at right-angles to the axis of the tubular-like front of the center member 1.

A slidable shield 6 is mounted on the said tubular-like front and serves to protect the taking lens and viewfinding lens when the camera is not in use but can be slid out of the way when it is desired to operate the camera.

The viewfinding and taking lenses are so located and the arrangement of the shield 6 is such that viewing cannot be carried out through the viewfinder unless the shield has been moved clear of both lenses.

In order to load the camera latch buttons 7 and 7' (Fig. 3) are pressed downwards, thereby unlatching the wing members 4 and 5 from hinged frames 17 and 17' carrying film spools 9 and 10. The camera can then be opened to its fullest extent, as shown in Fig. 2.

A full spool 9 of film is placed in hinged frame 17 and the paper leader threaded across and inserted in the empty spool 10 in the hinged frame 17'.

The camera is then closed to the position illustrated by Fig. 1, the latch buttons 7 and 7' moving upwards and catching automatically under spring pressure to connect the two wing members 4 and 5 to the frames carrying the film spools and ancillary mechanism.

When the camera is next extended, after loading, it opens to the position shown in Fig. 3 and is locked in this extended position by a bell crank lever 26. This lever 26 has an arm 95 (Fig. 2), located beneath the top of the wing 4, which arm is loaded by a spring 96 and carries a pawl 100 which engages a notch 101 in a cam form 102 carried by an intermediate member 8 and thereby holds the camera in the extended position until the lever 26 is manually operated to release the pawl 100 from notch 101 to allow the camera to be closed again.

The member 8 is pivotally supported on the center member 1, and of segmental form as viewed in plan with an outer arcuate wall which is located between the inner and outer arcuate rear walls of wing members 4 and 5 to constitute a light-tight rear closure for the camera when in extended condition for picture taking. The member 8 is held in position between the two wing members 4 and 5 (Fig. 3) by means of a sliding latch 103 (Fig. 4) the end of which engages a slot 104 (Fig. 2) in the member 8, the latch 103 being integral with the latch 7'.

After the roll of film has been inserted the two wing members are extended to the position shown in Fig. 3 (which is ultimately the picture taking position) and closed again to the Fig. 1 position a given number of times. This action winds the leader and film on to the take-up spool until the first piece of film is in position for an exposure to be made.

The film is wound on to the take-up spool by the closing action of the wing members 4 and 5, this action actuates a gear train 11, 12, 13 and 14 shown to best advantage by Fig. 3. Pinion 11 is coupled to the take-up spool 10 and is driven by gear 12 forming part of a step-up ratio gear comprising gears 12 and 13.

A free-wheel coupling is incorporated between the gears 12 and 13, and the gear 13 is driven by the spring loaded gear segment 14 which is pivoted about an axis 15, the axis 15 coinciding conveniently with the axis of pivot of the wing members 4 and 5.

As the two wing members are folded together a pin 16 mounted on frame 17 (latched to the wing member 4) engages the face 18 of the gear segment 14 and drives the said segment which, in turn, drives the gears 13, 12 and 11 and consequently the take-up spool 10.

On opening the wing members the gear train freewheels and the take-up spool is held rigidly by pawl mechanism embodied in the pinion 11. This operation pulls the film 19 through the camera and off the supply spool 9 so that on the camera reaching its "out" position as shown in Fig. 3 the next film length is pulled into position ready for exposure.

Compensation for variation in the effective diameter of the take-up spool 10 is effected by varying the rotation of the film gear train as the film progresses from the first to the last film length. This is accomplished by means of a balanced lever 20 which is pivoted at 21 to the frame 17 and loaded by means of a spring 22 in such a way that one of its arms 23 is held against the backing paper of the film on the supply spool 9.

As the film on the supply spool decreases in diameter the arm 23 follows this diameter, thereby causing the other arm 24 on the lever 20 to act as a variable stop for a pin 25 mounted on the gear segment 14.

When the camera is closed after an exposure has been made the initial closing movement brings the pin 25 into engagement with the arm 24 of the lever 20 and moves the said arm in a clockwise direction until pin 16 engages the face 18 of the gear segment 14, thereby giving a positive drive through the gear segment and gear train 13, 12 and 11 to the take-up spool 10.

It will thus be seen that when the supply spool is full the gear segment 14 will be permitted to move back further than when the spool is nearly empty, the gear segment consequently being driven through a larger angle when the supply spool is full and thereby giving complete compensation for the variable effective diameter of the take-up spool.

To take a further picture the camera is extended again to the position shown in Fig. 3 whereupon the lever 20 takes up its original position with its arm 23 resting on the supply spool whilst the gear segment 14 is held in the position to which it was moved in the preceding closing action by the engagement of a lever pawl 27 (Fig. 6), pivoted at 28 to the wing member 5, with a cam stop 97 on the gear segment 14.

In the specific embodiment of the invention illustrated by the accompanying drawings, it has been found convenient to embody a blade-type shutter.

Figs. 4 and 5 illustrate details of this and the manner in which it is operated.

The aperture of the lens 2 (Fig. 4) is normally closed by a shutter blade 29 consisting of a bent-down arm on a lever 30 pivoted at 31 to an inner frame 32 which is linked to the wing member 5. The lever 30 is spring urged by means of a spring 33 against a stop pin 34, and a second lever 35, urged by spring 36 against a stop pin 37 on the shutter lever 30, is pivoted axially with the said lever 30.

A bell-crank lever 38 is pivoted at 39 to the wing member 5 and has two arms 40 and 41, of which the arm 40 engages the lever 35 and the arm 41 co-operates, in turn, with a cam 42 (Fig. 5) located on the center member 1 of the camera to set the shutter as the camera is closed, the end of the arm 41 riding round the cam 42 and engaging and tensioning spring 43 during this movement of the camera.

The end 41 of the lever 38 is normally held by spring 43 against a lateral projection 44 on one arm 45 of a bell-crank lever 46, the second arm 47 of which is arranged to engage an arm 48 of a balanced lever 98 (Fig. 4) which is operated by the shutter release button 50 (Fig. 6C) in a manner to be described hereinafter.

A further bell-crank lever 51 is mounted below the lever 46, both these levers being pivoted to casing 52 inside the wing member 5.

One arm 53 of the lever 51 is spring urged clockwise whilst the other arm 54 is engaged and normally held by a cam 55, the arm 54 carrying at its further end a lateral projection 56.

The method of making an exposure and operating an exposure counter indicator 65 and the shutter 29 will now be described with particular reference to Figs. 4, 5 and 6 (assuming that the camera has been opened to the picture taking position illustrated by Fig. 3).

To make an exposure, the release button 50 (Fig. 6C) is pressed and pivots about its mounting 57 thereby bringing its face 58 into contact with pin 59 carried on lever pawl 60. Lever pawl 60 has a slot 61 providing a combined pivot and slide on a pin 62 mounted on the casing 52 (Fig. 3) inside the wing member 5 (Fig. 6C).

The pin 59 pushes the end 49 of lever 98, which lever is pivoted at 63 (Fig. 4) to the casing 52 inside the wing member 5, against the action of torsion spring 64 to transmit the necessary action for operating the shutter mechanism, described hereafter more fully.

The depression of the release button 50 also operates the film exposure counter 65 (Fig. 1), which indicates the number of the film being exposed, and this operation is effected in the following manner.

As the release button 50 continues its movement upon being pressed, the pin 59 has a combined rotational and sliding movement in relation to the pin 62 so that pawl face 66 on lever pawl 60 engages one of the ratchet teeth 67 forming part of the counter 65 rotatably mounted in the side wing member 5 in such a way that as the release button 50 is allowed to return after making the exposure the counter 65 is rotated one division.

The counter 65 is formed with further internal ratchet teeth 68 which, in turn, engage pin 69 mounted on lever pawl 27 so that as the counter is rotated in the action described above the lever pawl 27 is withdrawn from engagement with the cam stop 97 on the gear segment 14, thereby permitting the gear segment to rotate under the action of its loading spring until the pin 25 on the said gear segment engages the arm 24 of the lever 20 (Fig. 3).

Details of the internal ratchet teeth 68 on the counter 65 are shown in Fig. 7. In one position one of the teeth in the ratchet is cut away to form a cam form 81 whilst, in a further position, one of the teeth is left uncut to form a second cam form 99. The cam form 81 co-operates with pin 69 on lever pawl 27 (Fig. 6B) whilst the trailer strip is being wound on to the take-up spool after the last exposure has been made. With the counter in such a position pin 69 engages the cam form 81 and lever pawl 27 is thereby prevented from engaging cam 97 on the gear segment 14 so that closing and extension of the camera will continue to wind the film until the trailing edge of the paper backing strip has been completely wound on to the take-up spool. When the camera is in this condition a cam dwell 84 on a further cam 82 mounted on the counter permits a spring loaded lever 85, pivoted at 86 on the wing member 5, to move anti-clockwise so that abutment 72 carried on the said lever 85 moves behind pin 59 on lever pawl 60 and thus prevents the release button 50 from being depressed.

Upon reloading with a fresh roll of film and after closing the camera, the counter is turned manually until pin 69 is at the end of cam form 81 and lever 85 has been moved clockwise by cam 82, thereby permitting the release button 50 to be depressed.

On the return of release button 50 the counter is indexed to permit the pin 69 to enter a tooth space in the internal ratchet 68. The camera can then be closed and extended a number of times to wind the leader strip—pressing the release button 50 each time—until cam dwell 83 on cam 82 permits lever 85 to turn anti-clockwise again to lock the release button 50. In this position pin 69 on lever pawl 27 will engage the cam form 99 and this will indicate that the first picture position has been reached. The counter is then turned manually one division, pin 69 will still be in engagement with the cam form 99 but the cam dwell 83 will have moved out of engagement with the lever 85 and the cam 82 will turn this lever clockwise, thereby unlocking the release button 50 and permitting it to be operated to take the first picture.

The release button 50 is provided with two interlocks, the first interlock is so arranged that the release button cannot be pressed again after an exposure until the camera has been closed to wind the film, and the second interlock is so arranged as to prevent movement of the release button when the camera is in the closed condition as shown in Fig. 1, that is, not extended to take a picture.

The first interlock consists of an interlock lever 70 pivoted at 71 to the wing member 5. The lever 70 has a latch face 70′ which engages the pin 59 after the gear segment 14 has been released from engagement of its cam stop 97 with the lever pawl 27, after an exposure has been made. The release button 50 cannot then be pressed again until the camera has been closed to wind the film which closing action latches the cam stop 97 on the gear segment 14 with the lever pawl 27 ready for the next exposure. In this condition the interlock 70 is held out of the path of pin 59 by the engagement of its pin 74 with face 75 on gear segment 14.

The second interlock consists of a lever 76 spring urged in a clockwise direction and pivoted at 77 to the wing member 5. The lever 76 has a pawl face 78 which is moved to lie behind pin 59 when the camera is closed by the engagement of the end 79 of the lever 76 with a fixed cam face 80 mounted on the centre member 1 of the camera.

As the camera is extended to the position shown in Fig. 3 to take a picture, the movement of the lever 76 about the pivot 77 in relation to the cam face 80 permits the lever 76 to rotate clockwise, thereby removing the pawl face 78 from behind the pin 59.

The operation of the shutter mechanism when the film is being exposed is as follows.

On pressing the release button 50, as described above, movement is transmitted through pin 59 (Fig. 6) to lever arm 49 on lever 98 (Fig. 4) in such a way that the other arm 48 on the lever 98 moves the arm 47 (Fig. 5) of the bell crank lever 46 to release the arm 41 of lever 38 from pawl face 44. Lever 38 (Fig. 4) turns under the thrust of spring 43 to move lever 35 and, through pin 37, the shutter arm 30, to remove the shutter blade 29 from the aperture of the lens 2.

Lever arm 40 glides over the end of lever 35, permitting the shutter arm 30 to return to its original position and thus to close the shutter.

With the mechanism in this position a second exposure cannot be made until after the actuation of the latch 27 and cam stop 97 and the closing and opening of the camera again due to the action of the shutter release interlock 70 described above.

As the action of closing and opening the camera takes place the end 41 of lever 38 engages cam 42 formed on the stationary centre member 1 of the camera body (Fig. 5), and is pushed back to be engaged by pawl face 44 of the bell crank lever 46. During this movement the arm 40 of lever 38 engages the lever 35 (Fig. 4), rotating it anticlockwise against the action of its spring 36, until the end of lever 38 glides over the end of lever 35 and past it, permitting lever 35 to return to its original position whilst the shutter 29 is still closed.

In the embodiment of the shutter mechanism illustrated, the shutter has two speeds, one "instantaneous" and the other "brief." The method of obtaining the "instantaneous" exposure has been described above and that for obtaining a "brief" exposure will now be described.

The shutter speed control is shown at 90 in Fig. 5 and is located below the counter 65 (Fig. 1) in the wing member 5. The member 90 is pivoted to the wing member 5 and its cam 55 engages the arm 54 of bell crank lever 51 in the manner already described for an "instantaneous" exposure.

The member 90 carries a second cam 91 and a dwell 92 in which the end 93 of spring 43 rests when in the "instantaneous" position.

To obtain a "brief" exposure the speed control 90 (which is accessible from the exterior of the camera) is rotated in an anti-clockwise direction until the face of cam 91 engages the end 93 of spring 43, thereby increasing the tension on this spring and bringing the dwell 92 adjacent to the arm 54 of lever 51.

This action results in the bell crank lever 51 moving in a clockwise direction until the stepped cam 56 on the end of the said lever is in the path of the arm 41 on lever 38 (Fig. 4) whereby, upon the release button 50 being pressed to release the shutter in the normal way, the lever arm 41 is permitted to rotate just so far to hold the shutter lever 30 in the open condition without the end 40 of lever 38 passing over lever 35, thus keeping the shutter open as long as the shutter release button 50 is depressed.

On the removal of pressure from the shutter release button 50, the bell crank lever 51 moves in an anti-clockwise direction by reason of the thrust through the lever 98, thereby permitting the arm 41 on lever 38 to move into the notch space behind the stepped cam 56 on the end of lever 51.

If the camera is extended but no exposure made the film is not wound on when the camera is closed again but coils back in a loop into the space surrounding the supply spool 9 (Fig. 3) the folding action moving the film from the focal plane into the wing member 4 encasing the spool 9, the film transport mechanism remaining latched by the engagement of lever pawl 27 with cam stop 97 on gear segment 14 in these circumstances.

We claim:

1. A photographic camera of the still picture type comprising a center member having a columnar portion carrying a taking lens and a housing extending rearwardly from the top of said columnar portion and carrying view finder lenses therein, rigid walled wing members of segmental form in plan pivotally supported on said columnar portion of the center member, the respective wing members including rigid top and bottom walls cooperating with a rigid side wall and rigid inner and outer arcuate rear walls to form chambers for and including means for supporting a film supply spool and a film take-up spool, an intermediate member pivotally mounted on said center member and having a rigid arcuate rear wall to telescope between the inner and outer rear walls of said wing members to constitute therewith a light-tight rear closure for the camera on extension of the wing members to open the camera for picture taking, and means for latching the wing members and intermediate member to maintain the open picture-taking condition of the camera.

2. A photographic camera as recited in claim 1, wherein said latching means comprises manually adjustable means for latching said intermediate member to one of said wing members; said latching means including cooperating means on said intermediate member and said one wing member.

3. A photographic camera as recited in claim 2, wherein cooperating and manually releasable latch means on said intermediate member and the other wing member engage automatically to latch said center member and wing members to each other upon movement of said wing members into extended positions for picture taking.

4. A photographic camera as recited in claim 1, in combination with a shutter and shutter release mechanism, film transport means including cooperating elements carried by the respective wing members and operable by a folding of said wing members to advance an exposed film area to the take-up spool, means operable by an extension of said wing members to set said shutter for actuation and simultaneously to latch said film transport means against operation, and means operable by actuation of said shutter release mechanism to unlatch said film transport mechanism for operation thereof, whereby said wing members may be extended and folded repeatedly without effecting a film transport prior to actuation of said shutter release mechanism.

5. A photographic camera as recited in claim 4, in combination with an interlock lever movable by said shutter release mechanism upon its actuation to block a second actuation thereof, said interlock lever being moved into inoperative position by said film transport means upon again extending said wing members after folding them to effect a film transport.

6. A photographic camera as recited in claim 4, wherein said film transport mechanism comprises a gear segment supported upon said columnar portion of said center member for angular movement independently of said wing members, a gear train in mesh with said gear segment for driving the support for the take-up spool, the gear train including a one-way clutch for free-wheeling in one direction and a pawl for preventing reverse movement of the gear train, and means on the wing member having means for supporting the film supply spool for moving said gear segment upon a folding of the wing members.

7. A photographic camera as recited in claim 5, in combination with compensation means including an element positioned to bear upon a film supply roll on said means for supporting the same for varying the angular displacement of the gear segment to effect a uniform film advance at each actuation thereof.

8. A photographic camera as recited in claim 7, wherein said compensation means comprises a stop member on said gear segment, a lever pivoted on the wing member carrying the film supply spool, said lever having one arm engageable with said stop member and another arm engageable with the backing paper of a film on the supply spool, and spring means urging said second arm into contact with the paper backing; said other arm constituting said element.

9. A photographic camera as recited in claim 1, in combination with a spring-loaded lever carrying a shutter blade and pivotally supported by one of said wing members, and means including a shutter release button mounted on said one of said wing members for actuating said lever to move the shutter blade into exposure position.

10. A photographic camera as recited in claim 9, wherein said lever-actuating means includes a lever pawl supported for sliding and angular movement by said shutter release button, a pin on said lever pawl, and a linkage movable by said pin to actuate said lever carrying a shutter blade.

11. A photographic camera as recited in claim 10, in combination with interlock means operable upon actuation of said lever pawl to effect a shutter operation to interlock with said lever pawl pin to prevent a subsequent actuation thereof by said shutter release button, and means operable upon folding of the wing members after a shutter actuation to transport the exposed film area to a take-up film spool, and means operable upon a film transport to render inoperative said interlock means.

12. A photographic camera as recited in claim 10, in combination with interlock means operable on folding of the wing members to collapsed positions to engage said lever pawl pin and prevent actuation of said lever pawl by said shutter release button.

13. A photographic camera as recited in claim 1, in combination with a shutter and shutter release mechanism including a lever pawl mounted upon the wing member having means for supporting a film take-up spool for sliding and pivotal movement, a pin on said lever pawl, a release button for actuating said lever pawl, means actuated by the extension of said wing members to set said shutter, film transport means actuated by the folding of the wing members to drive the means supporting the take-up spool to wind the exposed film area upon the take-up spool, a wheel carrying two ratchets, one ratchet being engaged by said lever pawl to effect a step advance of the wheel at each actuation of the shutter release mechanism, a pivoted latch cooperating with a catch on said film transport means to lock the same against operation, said latch having a pin engaging the second ratchet to release the latch from said catch upon a step advance of the wheel by said lever pawl.

14. A photographic camera as recited in claim 13, wherein said wheel is mounted on one of said wing members and carries film exposure graduations to constitute a counter.

15. A photographic camera as recited in claim 13, in combination with an interlock lever movable upon an actuation of said lever pawl to actuate the shutter to extend into the path of said lever pawl pin and prevent a subsequent actuation of said lever pawl, said interlock lever being movable out of interlocking position by said film transport mechanism upon a folding of said wing members and subsequent extension thereof.

16. A photographic camera as recited in claim 13, wherein said ratchet wheel is provided with a cam having a dwell, said second ratchet has a portion thereof which engages the pin of said latch to release the latch from the catch of said film transport mechanism, and a lever having a portion engaging said cam and carrying an abutment blocking movement of said lever pawl when engaged with said cam dwell; whereby said wing members may be repeatedly folded and extended to advance the leader or trailer paper strip of a film without actuation of the shutter release mechanism.

17. A photographic camera as recited in claim 13, wherein said cam has two dwells spaced angularly by an amount corresponding to the length of the film, whereby said shutter-operating lever pawl is blocked from operation upon transport of the film beyond the exposure position.

18. A photographic camera as recited in claim 13, wherein said wheel is manually adjustable upon a completion of the winding on a leader strip to advance the cam dwell beyond engagement with the associated lever, thereby to condition the camera for alternate operations of the shutter and the film transport means.

19. A photographic camera as recited in claim 13, in combination with lever means actuated by folding of the wing members to block operation of the shutter release mechanism.

20. A photographic camera as recited in claim 1, wherein said means for supporting film-carrying spools comprise frames pivotally supported on the center member, means latching said frame to the respective wing members, and manually operable latch buttons for releasing said latching means to permit opening of the camera for the insertion and removal of film spools.

21. A photographic camera as claimed in claim 1, wherein a slidable shield is mounted on the columnar portion of said center member and serves to protect the taking lens and viewfinding lens when the camera is not in use but can be slid clear of these lenses when it is desired to operate the camera.

THOMAS WILLIAM CLIFFORD.
JOHN MILLS.

References Cited in the file of this patent

UNITED STATES PATENTS

| Number | Name | Date |
|---|---|---|
| 478,837 | Benedict | July 12, 1892 |
| 686,987 | Pautasso | Nov. 19, 1901 |
| 817,243 | Heath | Apr. 10, 1906 |
| 2,522,387 | Livens | Sept. 12, 1950 |